July 2, 1940. H. I. ROBINSON 2,206,367

SOUNDHEAD

Filed April 23, 1938

Inventor
Hyman I. Robinson
By
Attorney

Patented July 2, 1940

2,206,367

UNITED STATES PATENT OFFICE 2,206,367

SOUNDHEAD

Hyman I. Robinson, Philadelphia, Pa., assignor to Radio Corporation of America, a corporation of Delaware Application April 23, 1938, Serial No. 203,720

2 Claims. (Cl. 179—100.3)

This invention relates to a soundhead for attachment to a motion picture projector for the photoelectric reproduction of sound from film, and more specifically relates to an improvement in the film feed between the constant speed sprocket and the takeup reel in such devices.

My soundhead is an improvement on that described and claimed in Reynolds Patent 2,013,109 and Loomis et al. Patent 2,019,147, in the respect that it eliminates some of the parts described in the aforesaid Loomis et al. patent and retains substantially the same results.

One object of the invention is to provide an improved film takeup mechanism.

Another object of the invention is to provide an improved means for absorbing jerks in the film between the takeup mechanism and the sound reproduction point.

Another object of the invention is to provide an improved type of spring idler.

Another object of the invention is to provide an elasitance in the film path, the tension upon which varies more nearly direct with the deflection thereof than has heretofore been the case.

Figure 1:
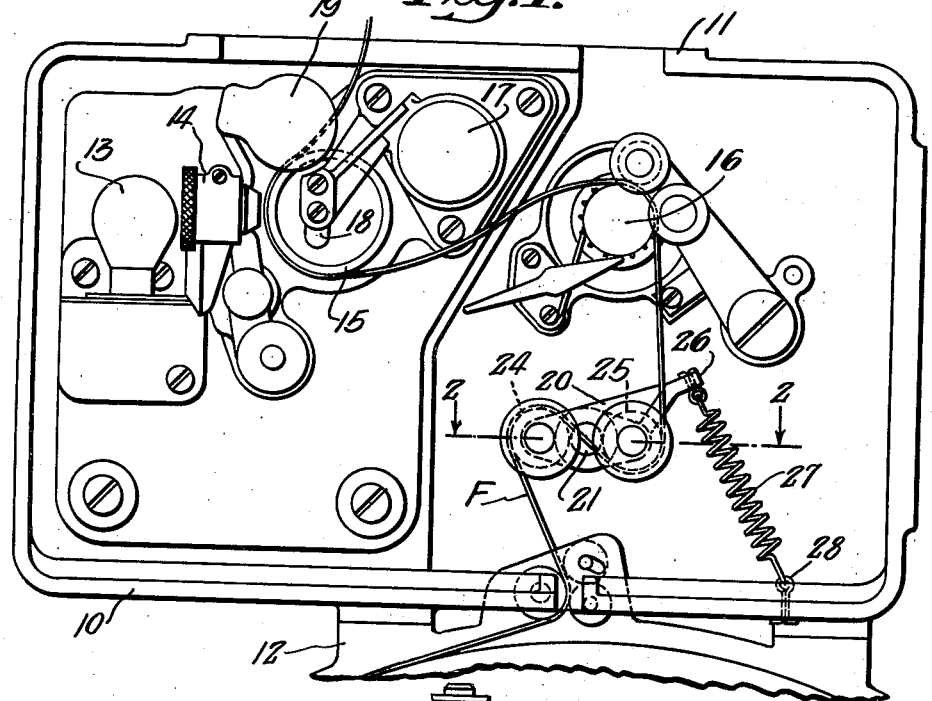
Figure 2:
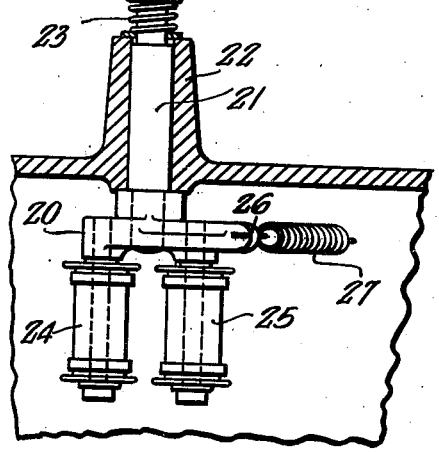

Other and incidental objects of the invention will be apparent to those skilled in the art from a reading of the following specification and an inspection of the accompanying drawing, in which Figure 1 is a side view of my improved soundhead, and Figure 2 is a section on the line 2—2 of Figure 1.

Referring first to Figure 1, the usual casing 10 is provided, which is adapted to support a motion picture projector on its upper surface 11, and to the bottom of which the usual type of film takeup magazine 12 is adapted to be secured. Within this soundhead there is provided an exciter lamp 13, an optical system 14 for directing a fine line of light from the exciter lamp upon the film, a film drum 15 provided with a viscous damper as in the aforesaid Reynolds and Loomis et al. patents, and a film-pulling sprocket 16, likewise as in the aforesaid Reynolds and Loomis et al. patents. An appropriate photocell housing 17 is provided into which light passing through the film is directed by an appropriate prismatic lens located at 18. The film is maintained in contact with the drum 15 by an appropriate pressure roller 19.

In the aforesaid Loomis et al. patent, the film passes from the sprocket corresponding to 16 in Figure 1 through a free member to a second sprocket, the first sprocket serving to pull the film at a uniform speed over the drum at the reproduction point, and the second sprocket serving to hold back the film and feed it to the takeup reel, thereby preventing any jerks due to faulty operation of the takeup drive or to any other inequalities in the takeup from being transmitted back to the sprocket which draws the film around the drum at the reproduction point.

I have found it possible to eliminate this second sprocket, together with its attendant driving mechanism and bearings, by substituting therefor my double idler assembly shown in more detail in Figure 2.

This idler assembly consists of a supporting member 20 carried on a shaft 21 mounted in an appropriate bearing 22 in the soundhead and held snugly therein by the spring 23. The member 20 carries two idler rollers 24 and 25, which are spaced at equal distances from the axis of the shaft 21. The member 20 is extended as indicated at 26 to permit the attachment of the spring 27, which is secured to the casing of the soundhead, as indicated at 28. This spring 27 pulls the idler in a clockwise direction, and when no film is in the device the line connecting the axes of the two idler pulleys 24 and 25 is tilted clockwise at an angle of about 30° from the horizontal. When film F is threaded into the soundhead, it follows the path shown in Figure 1, passing under the idler 25 and over the idler 24, thereby doubling the pull applied to the spring 27 as compared to the effect of a single idler. When the apparatus is running and film is being taken up in the takeup magazine 12, the idlers assume approximately the position shown in Figure 1 and a slight irregularity in the drive of the takeup mechanism causes them to rotate clockwise or counterclockwise with the shaft 21.

Due to the use of two idlers with a single spring, this idler arrangement is very compact, the amount of film which can be taken up by a given movement of the idler is very greatly increased as compared with a single spring idler pressed laterally against the film, and the tension of the film increases more nearly arithmetically with the deflection than is the case with a single spring idler, where the tension increases exponentially.

As pointed out above, the foregoing arrangement permits the omission of the usual let-off sprocket and still secures satisfactory operation of the soundhead without jerks of the takeup mechanism being too seriously transmitted to the film at the reproduction point on the drum 15.

Having now described my invention, I claim:

1. Apparatus of the class described including sound reproducing means, film takeup means, a single sprocket only between said sound reproducing means and said film takeup means for drawing film past said reproducing means, and a double-acting spring idler between said sprocket and said takeup means.

2. Apparatus of the class described including sound reproducing means, film takeup means, a single constant speed sprocket only between said sound reproducing means and said film takeup means for drawing film past said reproducing means, and a spring idler between said constant speed sprocket and said takeup means, said spring idler including two idler rollers mounted on a yoke rotatable about an axis midway between said rollers and a spring connected to said yoke.

HYMAN I. ROBINSON.